United States Patent [19]
Dransch et al.

[11] 3,887,576
[45] June 3, 1975

[54] SUBSTITUTED PHENYL-CARBAMOYL-ALKYL CARBONYLAMINO-BENZIMIDAZOLES

[75] Inventors: Gunther Dransch, Eschborn/Taunus; Kurt Hartel, Hofheim/Taunus; Gerhard Horlein, Frankfurt am Main; Hubert Schonowsky, Neu-Isenburg; Adolf Studeneer, Kelkheim/Taunus, all of Germany

[73] Assignee: Hoechst Aktiengesellschaft, Frankfurt am Main, Germany

[22] Filed: Mar. 15, 1973

[21] Appl. No.: 341,760

[30] Foreign Application Priority Data
Mar. 21, 1972  Germany............................ 2213553

[52] U.S. Cl............................... 260/309.2; 424/273
[51] Int. Cl............................................. C07d 49/38
[58] Field of Search................................. 260/309.2

[56] References Cited
UNITED STATES PATENTS
3,541,213  11/1970  Klopping........................ 260/309.2
3,626,070  12/1971  Soboczenski et al............ 260/309.2
3,751,425   8/1973  Osieka et al..................... 260/309.2

OTHER PUBLICATIONS
Littler, Chem. Abst., Vol. 73, No. 2992f (1970), QD1.A51.

Primary Examiner—Natalie Trousof
Attorney, Agent, or Firm—Curtis, Morris & Safford

[57]  ABSTRACT

Substituted benzimidazoles of the formula

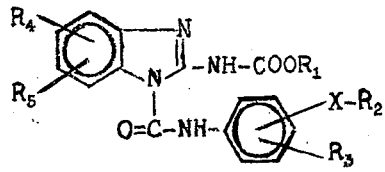

in which $R_1$ is alkyl, X is oxygen or sulfur, $R_2$ is haloalkyl or haloalkenyl and $R_3$, $R_4$ and $R_5$ each are hydrogen, halogen or alkyl, are valuable as systemic fungicides and as anthelmintic agents.

9 Claims, No Drawings

SUBSTITUTED PHENYL-CARBAMOYL-ALKYL CARBONYLAMINO-BENZIMIDAZOLES

The present invention relates to benzimidazoles of the formula

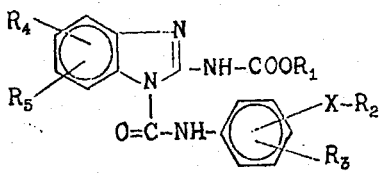

in which
R₁ is alkyl having 1 to 4 carbon atoms,
X is oxygen or sulfur,
R₂ is alkyl or alkenyl having 1 to 4 carbon atoms substituted by fluorine, chlorine or bromine, and each of R₃, R₄ and R₅ are hydrogen, fluorine, chlorine, bromine or alkyl having 1 to 4 carbon atoms, or if R₄ and R₅ are different, mixtures thereof.

The present invention also relates to processes for the manufacture of compounds of formula I, which comprises reacting
a. a benzimidazole of the formula

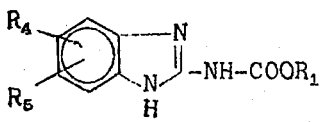

with an isocyanate of the formula

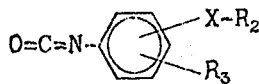

or
b. a benzimidazole derivative of formula II with a carbamic acid halide of formula

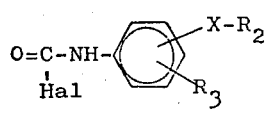

or
c. a chloro-(or bromo)-carbonylbenzimidazole derivative of formula

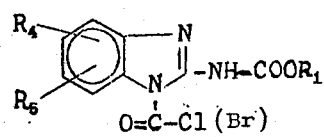

with an amine of formula

In the formulae, R₂ preferably stands for alkyl or alkenyl having 2 or 3 carbon atoms, R₃, R₄, R₅ preferably represent hydrogen, chlorine, methyl, and more preferably R₄ and R₅ are hydrogen and R₁ is methyl.

Corresponding to formulae II and V, the following compounds can be used, for example, as starting materials for the manufacture of compounds of formula I: 2-methoxy-, 2-ethoxy-, 2-n-propoxy-, 2-isopropoxy-, 2-n-butoxy-, 2-isobutoxy-carbonylamino-benzimidazoles; 4- or 5-methyl-, 4- or 5-ethyl-, 4- or 5-propyl-, 4- or 5-sec-butyl-, 4- or 5-tert.butyl-, 4- or 5-chloro-, 4- or 5-bromo-, 4,5-dichloro-, 4,6-dimethyl-, 4,5-dimethyl-, 5-chloro-6-methyl-, 5-chloro-6-butyl-, 6-chloro-5-propyl-2-methoxy-(ethoxy-, propoxy-, butoxy-) carbonylamino-benzimidazoles or the corresponding chloro-carbonyl-benzimidazoles of formula V. Preferred compounds are those in which R₄ and R₅ are hydrogen.

Suitable compounds to be reacted with the above starting compounds are compounds of formulae III, IV, or VI in which R₂ is substituted at least once by fluorine, chlorine or bromine. In particular, R₂ may have the following meanings: p-, m-, or o-difluoromethoxy or -difluoromethylmercapto, p-, m-, o-1,1,2,2,-tetrafluoro-ethoxy or -ethylmercapto, o-, m-, or p-1,1,2,-trifluoro-4-chloro-ethoxy or -ethylmercapto, o-, m-, p-1,2-dichloro-vinyloxy or -vinylmercapto, o-, m-, p-1,1,2,3,3,3-hexafluoro-propoxy or -propylmercapto, p- or m-1,1-difluoro-2-bromo-2-fluoro-ethoxy of -ethylmercapto, p- or m-1,1-difluoro-2-fluoro-2-chloro-ethoxy or -ethylmercapto, o-, m-, p-2-chloro-ethoxy or -ethylmercapto, o-, m-, p-3-bromo-propoxy or -propylmercapto, o-, m-, p-3,3-dichloro-2-propenyloxy- or -propenylmercapto, o-, m-, p-2,3,3,-trichloro-2-propenyloxy or -propenylmercapto, o-, m-, p-1,2-dibromo-vinyloxy or vinyl-mercapto, p-1,1,1,4,4,4,-hexafluoro-3-chloro-2-butenyl-(2)-oxy- or -mercapto.

Preferably preferred compounds of formulae III, IV or VI are those which contain a halo-substituted alkoxy or alkyl-mercapto group having n = 2 or 3 carbon atoms and from among them those having 2 n fluorine and/or chlorine and/or bromine atoms and in β-position to X a hydrogen atom, as well as those having an 1,2-dichlorovinyl group in R₂ position.

The starting compounds and their reactants are partly known, partly they can be prepared by known methods (cf. for example J. Am. Soc. 56. page 144 (1934), US Pat. No. 2,933,502).

The nitro compounds necessary for the preparation of the amines were obtained in a manner similar to the methods described in J. Am. Soc. 70, page 593 (1948); Ind. Engineering Chem. 39, page 412 (1947); J. Org. Chem. 25, page 2009 (1960), and Bull. Soc. Chim. Belges 74, page 270 (1965), and transformed into the amines according to conventional methods.

Several of the amines could be synthesized directly according to the method of Bull. Soc. Chim. France, 5, page 581 (1957).

The amines thus obtained were converted according to the usual methods into the carbamic acid halides or isocyanates.

The process according to (a) is preferably carried out in an inert organic solvent, for example dimethyl formamide, methylethyl ketone, methylene chloride, chloroform, chlorobenzene, tetrahydrofurane, or acetonitrile, at a temperature in the range of from about 5° to 50°C. It is advantageous to use a small excess of isocyanate. The reaction periods are, in general, 1 to 8 hours.

When operating according to process (b) the carbamic acid chloride of formula IV is first prepared by adding, at 0° to 25°C, an amine of formula VI to a solution of phosgene in an inert organic solvent, such as benzene or tetrahydrofurane, separating from the hydrochloride of the amine by filtration and distilling off the excess phosgene under reduced pressure. An approximately stoichiometric amount of a 2-alkoxycarbonyl-amino-benzimidazole derivative of formula II and subsequently an acid-binding agent, for example a tertiary amine or potassium carbonate are then added. In this stage of the reaction the temperature is generally in the range of from 0° to 35°C. The reaction mixture is worked up in usual manner.

According to process (c) a 2-alkoxycarbonyl-aminobenzimidazole derivative of formula II is treated with a solution of phosgene in an inert organic solvent at about −20° to +20°C, then an equivalent amount of a tertiary amine, for example dimethyl-aniline, triethylamine, or pyridine, is added and the hydrochloride is separated. After having distilled off the excess phosgene the reaction product is reacted with twice the stoichiometric amount of an amine of formula VI at about 0° to 40°C and the mixture is worked up in usual manner.

The compounds according to the invention are characterized by very good fungicidal properties, and especially by a very broad range of action. As they have a very low toxicity to warm blooded animals and not only a protective but also a curative systemic effect, they are especially suitable to protect plants, above all in agriculture.

Owing to their systemic activity the compounds of the invention can be used for combating fungus diseases on plants by either seed treatment, soil treatment or foliar treatment.

A number of fungi against which the compounds are effective are listed below:

| | |
|---|---|
| Botrytis cinerea | Erysiphe cichoracearum |
| Oidium tuckeri | Piricularia oryzae |
| Cercospora beticola | Pellicularia sasakii |
| Cercospora musae | Fusarium nivale |
| Uromyces phaseoli | Rhizoctania solani |
| Septoria apii | Verticillum alboatrum |
| Podoshaera leucotricha | Fusarium solani |
| Venturia inaequalis | |

The active compounds of formula I can be used per se or advantageously in combination with additives, i.e. in the form of known preparations, for example as wettable powders, dusting powders, or emulsion concentrates, and in admixture with other biocidally active compounds, especially other fungicides, as well as insecticides, acaricides, or herbicides. The preparations contain from 5 to 90 percent of the active ingredient or ingredients.

The compounds of formula I can also be used for combating parasitic diseases of warm blooded animals, especially helminths.

They exhibit an especially pronounced anthelminthic activity, combined with a good compatibility, against stronyles parasitic in the alimentary tract mainly of ruminants. These parasites may cause great economical damage in animal breeding. Hence, the compounds of the invention represent valuable medicines. In practice, the anthelminthic agents are administered orally or subcutaneously. For oral administration ready suspensions (1 to 50 percent, preferably 3 to 15 percent strength) water suspendable powders (concentration 1 to 80 percent, preferably 40 to 70 percent), pastes or granules of different concentrations are used. For parenteral treatment sterile solutions of different concentrations are suitable. To achieve a good distribution, stabilization and conservation of the active ingredient as well as an improved resorption additives are necessary, preferably talc, lactose, magnesium stearate, starch, or polyethylene glycol or finely dispersed silicic acid.

The following examples illustrate the invention, Examples 1 to 21 being concerned with the preparation of benzimidazoles according to the invention, while the following examples illustrate their fungicidal effect. In the latter biological examples 1-butylcarbamoyl-2-methoxycarbonyl-aminobenzimidazole, (common name benomyl) was used as the most closely related commercial product. In comparison to benomyl, the compounds of formula I are equally good or even better in their effect when used in the same concentrations by weight; they are more effective, however, when molar concentrations are compared.

EXAMPLE 1 a. Preparation of p-nitrophenyl-difluoromethyl sulfide used as precursor

168 Grams of p-nitrothiophenol were added to the solution of 250 g of sodium hydroxide in 285 ml of water and 370 ml of ethylene glycol dimethyl ether and at 70°–80°C 130 g of difluorochloromethane were introduced into the suspension while stirring. After cooling, 500 ml of water and 200 ml of ether were added to the suspension, the whole was filtered, the ether phase was separated and the aqueous phase extracted three times, each time with 200 ml of ether. The combined ether extracts were dried over potassium carbonate, freed from solvent under reduced pressure and the p-nitrophenyl-difluoromethyl sulfide was distilled at 90°–93°C/0.05 mmHg.

b. Preparation of p-aminophenyl-difluoromethyl sulfide used as precursor

The suspension of 106 g of p-nitrophenyl-difluoromethyl sulfide, 245 g of iron powder and 2 ml of glacial acetic acid in 1.7 liters of water was stirred for 10 hours at 85°–90°C, after cooling it was filtered and the residue washed with 200 ml of benzene. The aqueous phase was extracted twice, each time with 200ml of benzene, soda was added to adjust a pH of 11 and the iron oxide was filtered off. It was washed with benzene and the aqueous phase was again extracted with 200 ml of benzene. The combined benzene extracts were dried over potassium carbonate, the benzene was distilled first and then the p-aminophenyl-difluoromethyl sulfide; boiling point 84°C/0.1 mm Hg.

c. Preparation of p-difluoromethyl-mercaptophenyl isocyanate used as reactant

A solution of 63 g of p-aminophenyl-difluoromethyl sulfide in 100 ml of chlorobenzene was dropped at 0°–10°C into a solution of 150 g of phosgene in 400 ml of chlorobenzene and, while introducing a weak current of phosgene, the temperature was raised to 130°C within 8 hours. When the reaction was terminated, the phosgene in excess was removed from the clear solution by a nitrogen current and the solution was freed from chlorobenzene under reduced pressure. The p-difluoro-methyl-mercaptophenyl isocyanate was then distilled at 76°–78°C/0.3 mm Hg.

d. 1-(4-difluoromethylmercapto)-phenylcarbamoyl-2-methoxycarbonylamino-benzimidazole 22 Grams of p-difluoromethylmercapto-phenyl isocyanate were added at room temperature to the suspension of 19.1 g of 2-methoxycarbonyl-aminobenzimidazole in 400 ml of methylene chloride and the mixture was stirred for 6 hours. By heating the suspension for a short period of time at 45°C the reaction product was completely dissolved and filtered off from unreacted 2-methoxycarbonylamino-benzimidazole. The methylene chloride solution was concentrated under reduced pressure, gasoline was added to the residue, the mixture was filtered and the reaction product dried under reduced pressure. 34 Grams of 1-(4-difluoromethylmercapto-phenylcarbamoyl)-2-methoxy-carbonylamino-benzimidazole (87 percent of the theory) were obtained, decomposition point 326°C.

C$_{17}$H$_{14}$N$_4$O$_3$S (392.4).

Calc.: C, 52.05%; H, 3.59%; F, 9.68%; N, 14.28%.
found: C, 52.00%; H, 3.5%; F, 9.9%; N, 14.30%.

EXAMPLE 2

1-[3-(1,1,2,2-tetrafluoroethoxy)-phenylcarbamoyl]-2-methoxycarbonylamino-benzimidazole 19.1 Grams of 2-methoxycarbonylamino-benzimidazole were suspended in 600 ml of chloroform and to the suspension 24.1 g of 3-(1,1,2,2-tetrafluoroethoxy)-phenyl isocyanate were added. The suspension was stirred for 7 hours at room temperature, heated at 40°C and undissolved matter was separated by filtration. The chloroform solution was concentrated under reduced pressure and the remaining 1-[3-(1,1,2,2-tetrafluoro-ethoxy)-phenylcarbamoyl]-2-methoxycarbonylamino-benzimidazole was washed with gasoline. The crystals were dried at room temperature under reduced pressure. Yield 32 g (78 percent of the theory); decomposition point 295°C.

C$_{18}$H$_{14}$F$_4$N$_4$O$_4$ (426.3).

calc.: C, 50.72%; H, 3.30%; F, 17.82%; N, 13.14%.
found: C, 50.8%; H, 3.0%; F, 17.7%; N, 12.9%.

In analogous manner the compounds listed in the following Table were obtained.

TABLE

| Example | Formula | Decomposition point (°C) | Analysis calc. | | found |
|---|---|---|---|---|---|
| 3 | 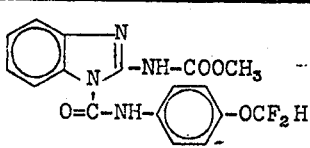 | 320 | 54.26 3.72 10.09 14.89 | C H F N | 53.9 3.7 10.0 14.8 |
| 4 | 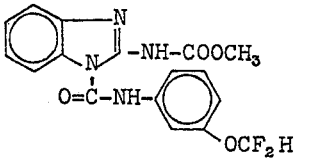 | 309 | 54.26 3.72 10.09 14.89 | C H F N | 54.0 3.7 10.2 14.7 |
| 5 | 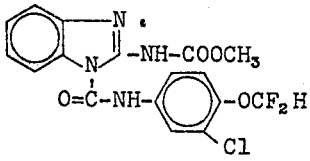 | 320 | 49.72 3.19 9.24 13.64 | C H F N | 49.5 3.1 9.3 13.7 |
| 6 | 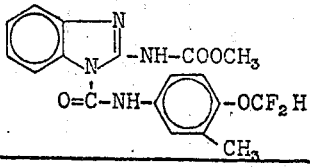 | 325 | 55.38 4.13 9.72 14.35 | C H F N | 55.2 4.2 9.0 14.6 |

TABLE—Continued

| Example | Formula | Decomposition point (°C) | Analysis calc. | | Analysis found | |
|---|---|---|---|---|---|---|
| 7 | benzimidazole-NH-COOCH₃, O=C-NH-phenyl-OCF₂-CFClH | 285 | 48.84 | C | 49.1 | |
| | | | 3.18 | H | 3.5 | |
| | | | 12.87 | F | 12.9 | |
| | | | 12.66 | N | 12.6 | |
| 8 | benzimidazole-NH-COOCH₃, O=C-NH-phenyl-SCF₂-CFClH | 289 | 47.12 | C | 46.8 | |
| | | | 3.04 | H | 3.3 | |
| | | | 12.42 | F | 12.2 | |
| | | | 12.22 | N | 11.9 | |
| 9 | benzimidazole-NH-COOCH₃, O=C-NH-phenyl-OCF₂CCl₂H | 175 | 47.08 | C | 47.0 | |
| | | | 3.07 | H | 3.1 | |
| | | | 8.27 | F | 7.9 | |
| | | | 12.20 | N | 12.5 | |
| 10 | benzimidazole-NH-COOCH₃, O=C-NH-phenyl(Cl)-OCF₂CCl₂H | 155 | 43.80 | C | 43.5 | |
| | | | 2.65 | H | 2.6 | |
| | | | 7.69 | F | 7.4 | |
| | | | 11.35 | N | 11.3 | |
| 11 | benzimidazole-NH-COOCH₃, O=C-NH-phenyl(CH₃)-OCF₂-CCl₂H | 330 | 48.23 | C | 48.5 | |
| | | | 3.40 | H | 3.4 | |
| | | | 8.02 | F | 8.0 | |
| | | | 11.84 | N | 11.6 | |
| 12 | benzimidazole-NH-COOCH₃, O=C-NH-phenyl(CH₃)-OCF₂-CCl₂H | 175 | 48.23 | C | 47.9 | |
| | | | 3.40 | H | 3.3 | |
| | | | 8.02 | F | 8.2 | |
| | | | 11.84 | N | 11.9 | |
| 13 | benzimidazole-NH-COOCH₃, O=C-NH-phenyl-OCF₂CHFBr | 280 | 44.38 | C | 44.2 | |
| | | | 2.89 | H | 3.0 | |
| | | | 11.69 | F | 11.9 | |
| | | | 11.50 | N | 11.6 | |
| 14 | benzimidazole-NH-COOCH₃, O=C-NH-phenyl-OCCl=CHCl | 340 | 51.32 | C | 51.2 | |
| | | | 3.35 | H | 3.2 | |
| | | | 16.83 | F | 17.1 | |
| | | | 13.30 | N | 13.0 | |
| 15 | benzimidazole-NH-COOCH₃, O=C-NH-phenyl-OCF₂-CHF-CF₃ | 275 | 47.92 | C | 48.1 | |
| | | | 2.96 | H | 3.1 | |
| | | | 23.94 | F | 23.6 | |
| | | | 11.77 | N | 12.0 | |
| 16 | benzimidazole-NH-COOC₂H₅, O=C-NH-phenyl-OCF₂-CHFCl | 153 | 49.96 | C | 49.9 | |
| | | | 3.53 | H | 3.6 | |
| | | | 12.48 | F | 12.2 | |
| | | | 12.27 | N | 12.0 | |

TABLE —Continued

| Example | Formula | Decomposition point (°C) | Analysis calc. | | Analysis found | |
|---|---|---|---|---|---|---|
| 17 | benzimidazole-NH-COOC$_4$H$_9$ with O=C-NH-phenyl-OCF$_2$-CHFCl | 138 | 52.03<br>4.15<br>11.76<br>11.56 | C<br>H<br>F<br>N | 51.9<br>4.0<br>11.7<br>11.4 | |
| 18 | H$_3$C-(H$_3$C)-benzimidazole-NH-COOCH$_3$ with O=C-NH-phenyl-OCF$_2$-CHFCl<br>isomer mixture | 282 | 49.96<br>3.53<br>12.48<br>12.27 | C<br>H<br>F<br>N | 50.0<br>3.4<br>12.4<br>12.4 | |
| 19 | H$_3$C-H$_3$C-benzimidazole-NH-COOCH$_3$ with O=C-NH-phenyl-OCF$_2$-CHFCl | 306 | 51.03<br>3.85<br>12.11<br>11.90 | C<br>H<br>F<br>N | 50.8<br>3.8<br>11.8<br>12.1 | |
| 20 | Cl-(Cl)-benzimidazole-NH-COOCH$_3$ with O=C-NH-phenyl-OCF$_2$-CHFCl<br>isomer mixture | 180 | 45.31<br>2.74<br>11.94<br>11.74 | C<br>H<br>F<br>N | 45.2<br>2.7<br>11.7<br>11.5 | |
| 21 | Cl-Cl-benzimidazole-NH-COOCH$_3$ with O=C-NH-phenyl-OCF$_2$-CHFCl | 210 | 42.25<br>2.36<br>11.14<br>10.95 | C<br>H<br>F<br>N | 42.1<br>2.2<br>11.3<br>11.0 | |

EXAMPLE 22

Plants of cucumbers in the two-leaf stage were strongly infested with conidia of cucumber mildew— *Erysiphe cichoracearum*—and 5 days after infestation the plants were sprayed to the drip-off with spray liquors containing per liter 100, 50, 25, 12.5, 6, and 3 milligrams, respectively, of active compound. As comparative compound the benzimidazole derivative 1-butylcarbamoyl-2-methoxy-carbonylamino-benzimidazole (benomyl) was used in the same concentrations. After drying of the layer of active ingredient, the plants were placed in a greenhouse where they were kept at 20°C and 80–90 percent of relative atmospheric humidity. After a period of 14 days the plants were examined as to their infestation with mildew. The result, expressed as degree of effectiveness in percent, is listed in Table I.

TABLE I

| Compound of Example | R = phenyl-X-R$_2$/R$_3$ | Curative effect against cucumber mildew in ppm of active ingredient | | | | | |
|---|---|---|---|---|---|---|---|
| | | 100 | 50 | 25 | 12.5 | 6 | 3 |
| 7 | phenyl-OCF$_2$-CFClH | 100 | 100 | 100 | 97 | 95 | 90 |
| 2 | phenyl-OCF$_2$-CHF$_2$ | 100 | 100 | 100 | 95 | 95 | 85 |
| 6 | phenyl-OCF$_2$H, CH$_3$ | 100 | 100 | 95 | 90 | 85 | 75 |

TABLE I (cont.)

| Compound of Example | R = —⌬—X—R₂ / R₃ | Curative effect against cucumber mildew in ppm of active ingredient | | | | | |
|---|---|---|---|---|---|---|---|
| 5 | —⌬—OCF$_2$H / Cl | 100 | 100 | 100 | 95 | 90 | 85 |
| 14 | —⌬—O—CCl=CClH | 100 | 100 | 100 | 97 | 95 | 90 |
| 9 | —⌬—OCF$_2$—CCl$_2$H | 100 | 100 | 100 | 97 | 95 | 90 |
| 12 | —⌬—CH$_3$ / OCF$_2$—CCl$_2$H | 100 | 100 | 100 | 97 | 95 | 90 |
| 10 | Cl—⌬—O—CF$_2$—CCl$_2$H | 100 | 100 | 100 | 97 | 95 | 90 |
| 15 | —⌬—O—CF$_2$—CFH—CF$_3$ | 100 | 100 | 100 | 98 | 95 | 95 |
| 11 | —⌬—OCF$_2$—CHCl$_2$ / CH$_3$ | 100 | 100 | 100 | 100 | 97 | 95 |
| 13 | —⌬—O—CF$_2$—CHFBr | 100 | 100 | 100 | 98 | 97 | 95 |
| comparative compound | benomyl | 100 | 100 | 98 | 95 | 90 | 85 |
|  | untreated | 0 | 0 | 0 | 0 | 0 | 0 |

EXAMPLE 23

Wheat plants in the two-leaf stage were treated with spray liquors containing per liter 2,000, 1,000, 500, 250, and 125 milligrams, respectively, of the compounds listed in the following Table II, in a manner such that only the two formed leaves became wet. The commercial product benomyl was used for comparison in the same concentrations.

After drying of the layer of active ingredient, the plants were placed in the greenhouse until they had grown to the four-leaf stage. The plants were then strongly infested with conidia of powdery mildew of wheat. After an incubation time of 10 days the plants were examined as to their infestation with mildew, the leaves which had not been treated with the active ingredient being taken for evaluation. The results indicated in Table II show that the compounds of the invention had the same effect as the comparative substance benomyl, although, calculated on the effective molecule, the content of active ingredient was much lower.

TABLE II

| Compound of Example | R = (phenyl with X-R₂ and R₃) | effect in % against mildew of wheat; application in 2-leaf stage; infestation in 4-leaf stage ppm of active ingredient | | | | |
|---|---|---|---|---|---|---|
| | | 2000 | 1000 | 500 | 250 | 125 |
| 7 | phenyl-$OCF_2$-$CFClH$ | 100 | 97 | 95 | 90 | 80 |
| 2 | phenyl-$OCF_2$-$CHF_2$ | 100 | 95 | 90 | 85 | 70 |
| 6 | phenyl-$OCF_2H$, $CH_3$ | 100 | 90 | 85 | 80 | 65 |
| 5 | phenyl-$OCF_2H$, $Cl$ | 100 | 97 | 95 | 90 | 80 |
| 14 | phenyl-$O$-$CCl$=$CClH$ | 100 | 100 | 97 | 95 | 90 |
| 9 | phenyl-$OCF_2$-$CCl_2H$ | 100 | 100 | 97 | 95 | 90 |
| 12 | phenyl-$CH_3$, $OCF_2$-$CCl_2H$ | 100 | 100 | 100 | 98 | 95 |
| 10 | phenyl-$OCF_2$-$CCl_2H$, $Cl$ | 100 | 100 | 100 | 97 | 95 |
| 15 | phenyl-$O$-$CF_2$-$CFH$-$CF_3$ | 100 | 100 | 98 | 95 | 90 |
| 11 | phenyl-$OCF_2$-$CHCl_2$, $CH_3$ | 100 | 100 | 97 | 95 | 90 |
| 13 | phenyl-$OCF_2$-$CHFBr$ | 100 | 100 | 100 | 98 | 95 |
| comparative compound | benomyl | 100 | 100 | 95 | 90 | 85 |
| | untreated | 0 | 0 | 0 | 0 | 0 |

EXAMPLE 24

Cucumber plants in the two-leaf stage were treated with the compounds listed in Table III in concentrations of 2,000, 1,000, 500, 250, 125, and 60 milligrams of active ingredient per liter of spray liquor in a manner such that only the two fully developed leaves, but not the other portions of the plant became wet. After application of the spray liquor, the plants were placed in the greenhouse and when the third and fourth leaves had developed the plants were strongly infested with conidia of cucumber mildew. 14 Days after infestation the plants were examined as to their infestation with mildew. The result, calculated in percent of effectiveness, calculated on infested surface of the leaves, is listed in the following Table III.

TABLE III

| Compound of Example | R = ⌬(X-R₂)(R₃) | effect in % against cucumber mildew; application in 2-leaf stage; infestation in 4-leaf stage; ppm of active ingredient | | | | | |
|---|---|---|---|---|---|---|---|
| | | 2000 | 1000 | 500 | 250 | 125 | 60 |
| 7 | ⌬-OCF₂-CFClH | 100 | 100 | 95 | 90 | 85 | 70 |
| 2 | ⌬-OCF₂-CHF₂ | 100 | 100 | 95 | 90 | 80 | 70 |
| 6 | ⌬(-OCF₂H)(CH₃) | 100 | 100 | 90 | 85 | 75 | 60 |
| 5 | ⌬(-OCF₂H)(Cl) | 100 | 100 | 95 | 90 | 80 | 70 |
| 14 | ⌬-O-CCl=CClH | 100 | 100 | 95 | 90 | 80 | 70 |
| 9 | ⌬-OCF₂-CCl₂H | 100 | 100 | 95 | 90 | 80 | 70 |
| 12 | ⌬(-CH₃)(OCF₂-CCl₂H) | 100 | 100 | 97 | 90 | 85 | 75 |
| 10 | ⌬(-O-CF₂-CCl₂H)(Cl) | 100 | 100 | 97 | 90 | 85 | 75 |
| 15 | ⌬-O-CF₂-CFH-CF₃ | 100 | 100 | 95 | 90 | 85 | 80 |
| 11 | ⌬(-OCF₂-CHCl₂)(CH₃) | 100 | 100 | 95 | 90 | 80 | 75 |
| 13 | ⌬-OCF₂-CHFBr | 100 | 100 | 97 | 90 | 85 | 75 |
| comparative compound | benomyl | 100 | 98 | 95 | 90 | 85 | 75 |
| | untreated | 0 | 0 | 0 | 0 | 0 | 0 |

EXAMPLE 25

Young vine seedlings in the four-leaf stage were strongly infested with conidia of vine mildew (*Oidium tuckeri*). After an incubation time of 5 days, the plants were treated with spray liquors of the compounds listed in Table IV in concentrations of 20, 10, 5, 2.5, 1.25, 0.6, and 0.3 mg of active ingredient per liter of spray liquor. Benomyl was used as comparative compound in the same concentrations. After drying of the layer of active ingredient, the plants were placed in the greenhouse at 20°C and high relative atmospheric humidity above 80 percent suitable for the growth of Oidium. After an incubation time of 14 days, the plants were examined as to their infestation with Oidium. The result in percent of effectiveness is listed in Table IV.

TABLE IV

| Compound of Example | R = 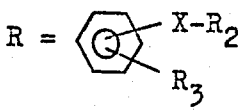 | effect in % against Oidium on vine with curative treatment 5 days after infestation with ppm of active ingredient | | | | | | |
|---|---|---|---|---|---|---|---|---|
| | | 20 | 10 | 5 | 2.5 | 1.25 | 0.6 | 0.3 |
| 7 |  | 100 | 100 | 95 | 90 | 80 | 70 | 65 |
| 2 |  | 100 | 100 | 95 | 90 | 75 | 70 | 60 |
| 6 |  | 100 | 100 | 98 | 95 | 90 | 80 | 70 |
| 5 |  | 100 | 100 | 100 | 97 | 95 | 90 | 80 |
| 14 |  | 100 | 100 | 95 | 90 | 85 | 80 | 70 |
| 9 |  | 100 | 100 | 97 | 95 | 90 | 80 | 75 |
| 12 |  | 100 | 100 | 95 | 90 | 85 | 75 | 70 |
| 10 |  | 100 | 100 | 97 | 95 | 90 | 80 | 75 |
| 15 |  | 100 | 100 | 95 | 90 | 85 | 75 | 70 |
| 11 |  | 100 | 100 | 95 | 90 | 80 | 75 | 70 |
| 13 |  | 100 | 100 | 95 | 90 | 85 | 75 | 70 |
| comparative compound | benomyl | 100 | 98 | 90 | 85 | 80 | 70 | 65 |
| | untreated | 0 | 0 | 0 | 0 | 0 | 0 | 0 |

EXAMPLE 26

Compost soil was treated and thoroughly mixed with the compounds listed in Table V in an amount of 10, 5, 2.5, 1.25, 0.6, and 0.3 milligrams per kilogram of soil. The soil was rilled in pots having a diameter of 10 cm and 2 cucumber seeds were sown in each pot, 5 pots being used for each test.

After emergence of the cucumber plants they were strongly infested in the two-leaf and four-leaf stage with conidia of cucumber mildew (*Erysiphe cichoracearum*) and the infested plants were placed overnight in an infestation chamber with 100 percent relative atmospheric humidity at 20°C. Subsequently, the plants were kept in the greenhouse at 20°C and a relative atmospheric humidity of 85–90 percent. After an incubation time of 14 days, the plants were examined as to their infestation with mildew. The results expressed as degree of effectiveness in percent are indicated in Table V.

TABLE V

| Compound of Example | $R = $ phenyl with $X-R_2$ and $R_3$ substituents | effect in % against cucumber mildew after soil treatment with ppm of active ingredient | | | | | |
|---|---|---|---|---|---|---|---|
| | | 10 | 5 | 2.5 | 1.2 | 0.6 | 0.3 |
| 7 | phenyl-$OCF_2$-CFClH | 100 | 100 | 100 | 97 | 95 | 80 |
| 2 | phenyl-$OCF_2$-$CHF_2$ | 100 | 100 | 100 | 97 | 95 | 85 |
| 6 | phenyl -$OCF_2$H, $CH_3$ | 100 | 100 | 100 | 95 | 90 | 80 |
| 5 | phenyl -$OCF_2$H, Cl | 100 | 100 | 100 | 97 | 95 | 85 |
| 14 | phenyl -O-CCl=CClH | 100 | 100 | 100 | 98 | 95 | 85 |
| 9 | phenyl -$OCF_2$-$CCl_2$H | 100 | 100 | 100 | 95 | 90 | 85 |
| 12 | phenyl -$CH_3$, $OCF_2$-$CCl_2$H | 100 | 100 | 100 | 97 | 95 | 80 |
| 10 | phenyl -O-$CF_2$-$CCl_2$H, Cl | 100 | 100 | 100 | 97 | 95 | 85 |
| 15 | phenyl -O-$CF_2$-CFH-$CF_3$ | 100 | 100 | 100 | 98 | 95 | 80 |
| 11 | phenyl -$OCF_2$-$CHCl_2$, $CH_3$ | 100 | 100 | 100 | 97 | 90 | 85 |
| 13 | phenyl -$OCF_2$-CHFBr | 100 | 100 | 100 | 98 | 95 | 80 |
| comparative compound | benomyl | 100 | 100 | 98 | 95 | 90 | 80 |
| | untreated | 0 | 0 | 0 | 0 | 0 | 0 |

EXAMPLE 27

Apple seedlings in the five-leaf stage were strongly infested at 20°C in a moisture chamber with conidia of apple mildew. 5 Days after infestation the plants were treated with the compounds listed in Table VI in concentrations of 100, 50, 25, 12.5, 6, 3 and 1.5 milligrams of active ingredient per liter of spray liquor. Benomyl was used as comparative substance. After drying of the layer of active ingredient, the plants were placed in a greenhouse at 20°C and a relative atmospheric humidity of 80–90 percent. After an incubation time of 14 days, the plants were examined as to their degree of infestation with mildew. The result is indicated in the following Table VI.

TABLE VI

| Compound of Example | R = 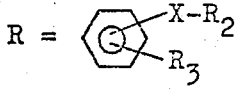 | effect in % against apple mildew with curative treatment with ppm of active ingredient | | | | | | |
|---|---|---|---|---|---|---|---|---|
| | | 100 | 50 | 25 | 12 | 6 | 3 | 1.5 |
| 7 | 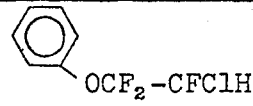 | 100 | 100 | 100 | 97 | 95 | 90 | 80 |
| 2 | 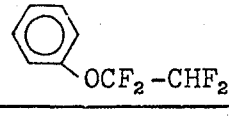 | 100 | 100 | 100 | 95 | 95 | 85 | 75 |
| 6 | 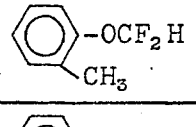 | 100 | 100 | 100 | 90 | 85 | 80 | 70 |
| 5 | 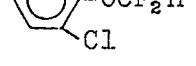 | 100 | 100 | 100 | 95 | 90 | 85 | 75 |
| 14 | 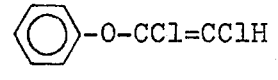 | 100 | 100 | 100 | 90 | 85 | 80 | 75 |
| 9 | 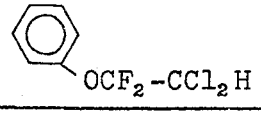 | 100 | 100 | 100 | 97 | 90 | 85 | 75 |
| 12 | 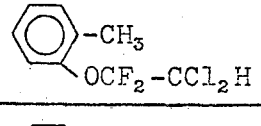 | 100 | 100 | 100 | 97 | 95 | 80 | 75 |
| 10 | 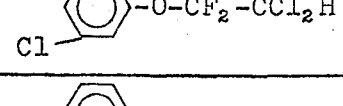 | 100 | 100 | 100 | 98 | 95 | 85 | 80 |
| 15 | 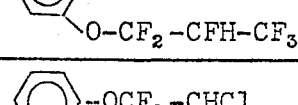 | 100 | 100 | 100 | 97 | 90 | 80 | 75 |
| 11 | 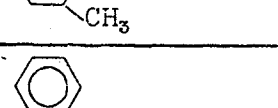 | 100 | 100 | 100 | 95 | 90 | 80 | 70 |
| 13 | 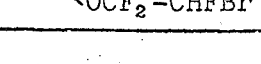 | 100 | 100 | 100 | 97 | 95 | 90 | 80 |
| comparative compound | benomyl | 100 | 100 | 98 | 90 | 85 | 75 | 70 |
| | untreated | 0 | 0 | 0 | 0 | 0 | 0 | 0 |

EXAMPLE 28

Celery plants in the grown-up five-leaf stage were stongly infested with spores of *Septoria apii* and placed for one day in a moisture chamber at 25°C. Thereafter, the plants were treated with the compounds listed in Table VII in concentrations of 500, 250, 125, 60, and 30 mg per liter of spray liquor and when the layer of spray liquor had dried the plants were placed in the greenhouse at a temperature of 25°C and a relative atmospheric humidity of 80–90 percent. After an incubation time of 3 weeks, the plants were examined as to their infestation with leaf spot. The result expressed in percent of effectiveness is indicated in Table VII.

TABLE VII

| Compound of Example | $R = \langle\!\!\bigcirc\!\!\rangle\!\!\begin{array}{c}X-R_2\\R_3\end{array}$ | effect in % against *Septoria apii* in celery with prophylactic treatment with ppm of active ingredient | | | | |
|---|---|---|---|---|---|---|
| | | 500 | 250 | 125 | 60 | 30 |
| 7 | $\langle\!\!\bigcirc\!\!\rangle\!-OCF_2-CFClH$ | 100 | 100 | 98 | 95 | 85 |
| 2 | $\langle\!\!\bigcirc\!\!\rangle\!-OCF_2-CHF_2$ | 100 | 98 | 95 | 90 | 80 |
| 6 | $\langle\!\!\bigcirc\!\!\rangle\!\begin{array}{c}-OCF_2H\\CH_3\end{array}$ | 100 | 100 | 97 | 95 | 80 |
| 5 | $\langle\!\!\bigcirc\!\!\rangle\!\begin{array}{c}-OCF_2H\\Cl\end{array}$ | 100 | 100 | 95 | 85 | 75 |
| 14 | $\langle\!\!\bigcirc\!\!\rangle\!-O-CCl=CClH$ | 100 | 100 | 98 | 95 | 85 |
| 9 | $\langle\!\!\bigcirc\!\!\rangle\!-OCF_2-CCl_2H$ | 100 | 100 | 98 | 95 | 90 |
| 12 | $\langle\!\!\bigcirc\!\!\rangle\!\begin{array}{c}-CH_3\\OCF_2-CCl_2H\end{array}$ | 100 | 100 | 95 | 90 | 85 |
| 10 | $Cl-\langle\!\!\bigcirc\!\!\rangle\!-O-CF_2-CCl_2H$ | 100 | 100 | 95 | 90 | 80 |
| 15 | $\langle\!\!\bigcirc\!\!\rangle\!-O-CF_2-CFH-CF_3$ | 100 | 100 | 98 | 95 | 90 |
| 11 | $\langle\!\!\bigcirc\!\!\rangle\!\begin{array}{c}-OCF_2-CHCl_2\\CH_3\end{array}$ | 100 | 100 | 95 | 90 | 85 |
| 13 | $\langle\!\!\bigcirc\!\!\rangle\!-OCF_2-CHFBr$ | 100 | 100 | 97 | 95 | 90 |
| comparative compound | benomyl | 100 | 100 | 95 | 85 | 75 |
| | untreated | 0 | 0 | 0 | 0 | 0 |

What is claimed is:
1. A benzimidazole of the formula

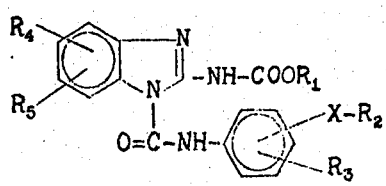

in which
R₁ is alkyl of 1 to 4 carbon atoms,
X is oxygen or sulfur,
R₂ is alkyl or alkenyl each of 1 to 4 carbon atoms, substituted by fluorine, chlorine or bromine, and each of R₃, R₄, R₅ represent hydrogen, fluorine, chlorine, bromine, or alkyl of 1 to 4 carbon atoms, and if R₄ and R₅ are different, mixtures thereof.
2. The compound of claim 1 were X is oxygen.
3. The compound of claim 1 having the formula

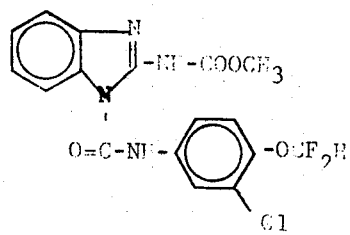

4. The compound of claim 1 having the formula

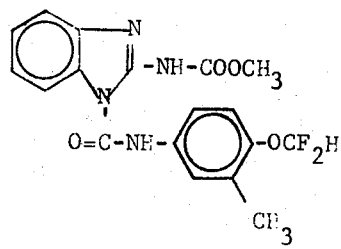

5. The compound of claim 1 having the formula

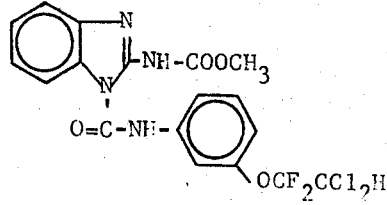

6. The compound of claim 1 having the formula

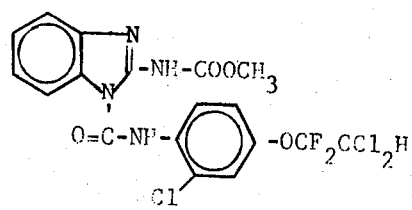

7. The compound of claim 1 having the formula

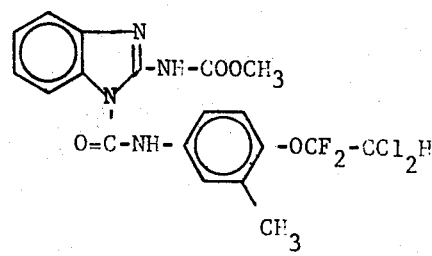

8. The compound of claim 1 having the formula

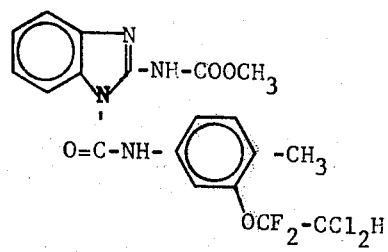

9. The compound of claim 1 having the formula

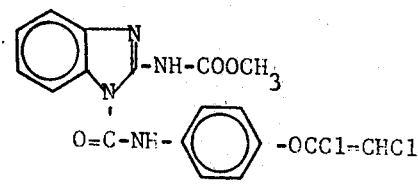

* * * * *